United States Patent [19]  [11] 4,018,867
Lee  [45] Apr. 19, 1977

[54] PROCESS FOR THE DISPOSAL OF ALUMINUM CONTAINING WASTE MATERIALS

[75] Inventor: Thomas E. Lee, Baton Rouge, La.

[73] Assignee: Ethyl Corporation, Richmond, Va.

[22] Filed: June 30, 1975

[21] Appl. No.: 591,526

Related U.S. Application Data

[63] Continuation-in-part of Ser. No. 554,601, March 3, 1975, abandoned.

[52] U.S. Cl. .............................. 423/115; 423/111; 423/130; 423/625; 423/600; 423/155; 260/448 A
[51] Int. Cl.$^2$ .......................................... C01F 7/00
[58] Field of Search .......... 423/111, 630, 115, 130, 423/600, 625; 200/448 A

[56] References Cited

UNITED STATES PATENTS

| | | | |
|---|---|---|---|
| 3,477,813 | 11/1969 | Fernald et al. | 423/119 |
| 3,848,053 | 11/1974 | Governale | 423/115 |
| 3,939,217 | 2/1976 | Meyer | 423/111 X |

OTHER PUBLICATIONS

Ziess, "Organometallic Chemistry", Reinhold Pub. Co., N.Y., 1960, p. 206.
Cotton et al., "Advanced Inorganic Chemistry", Interscience Pub., N.Y., 1972, last page.
Masterson et al., "Chemical Principles", W. B. Saunders Co., Philadelphia, 1969, p. 118.

*Primary Examiner*—Herbert T. Carter
*Attorney, Agent, or Firm*—Donald L. Johnson; John F. Sieberth; Shelton B. McAnelly

[57] ABSTRACT

This invention relates to the disposal of aluminum hydrocarbyl, aluminum hydrocarbyloxy, aluminum halide or aluminum hydride waste materials. Such materials are used as catalysts and may be present alone as well as in combination with similar compounds of other elements typically of Group IV-B, V-B, VI-B, VII-B or VIII. The present disposal process seeks to minimize environmental pollution and provide a product that is suitably used as land-fill. In the process of the invention, a system containing an aluminum hydrocarbon, hydrocarbonoxy, halide or hydride waste stream either with or without a co-present compound of another element as set forth is reacted with a hydroxide or carbonate of a Group I-A, II-A, IV-A, or V-A element under substantially anhydrous conditions. The reaction is comparatively mild and is suitably conducted in ordinary steel equipment without excessive corrosion problems. Diluents co-present with the waste materials are recovered for recycle in anhydrous form without requiring drying.

25 Claims, No Drawings

PROCESS FOR THE DISPOSAL OF ALUMINUM CONTAINING WASTE MATERIALS

CROSS-REFERENCE TO RELATED APPLICATION

This application is a continuation-in-part of application Ser. No. 554,601, filed March 3, 1975 and now abandoned.

INTRODUCTION

The disposal of materials containing aluminum compounds having hydrocarbyl, hydrocarbyloxy, hydride or halide radicals provides numerous difficulties because of the high reactivity of such compounds with water and additionally where the compounds contain halogen, to the production of aqueous hydrohalic acid which is highly corrosive to low cost materials of construction such as mild steel. In addition, many discard materials of the foregoing type contain residual quantities of free aluminum which must be converted to more or less stable inactive compounds, preferably compounds suitable for use as land-fill and which are not readily leached out by water so as to be carried into lakes and streams. As far as is known, there has been no satisfactory prior art process for disposing of such waste materials as described in the foregoing. The burning of such materials is a possibility; however, it is not a suitable answer to the problem due to the difficulty of avoiding the release of undesired materials to the atmosphere and the problem of handling incompletely hydrated aluminum residues which result from the burning. The treatment of such discard materials with water is likewise unsatisfactory because of the highly reactive nature of the aluminum compounds and the difficulty of avoiding localized excesses which result in uncontrolled reactions which can be dangerous as well as alarming or disturbing to those within audible range. Furthermore, in some instances the waste materials are present in an anhydrous solvent system which must be recycled in a water-free condition. The use of an aqueous treatment with such solvents makes it necessary to dry the recovered solvents prior to re-use, introducing extra complication, difficulty and expense.

As will be seen from the subsequent discussion, the present process is a special form of inherently controlled anhydrous hydrolysis which avoids the presence of free water. This avoids violent reactions as well as the formation of highly corrosive aqueous hydrogen halide by-products. The hydrolysis of aluminum compounds such as aluminum alkyls, and aluminum alkoxides, is well known in the prior art; however, the known hydrolysis processes are usually conducted in an excess of water to facilitate recovery of the products. For the purposes of waste disposal; however, the separation of products is of comparatively minor importance as long as the products are of a form which can be discarded without excessive adverse consequences in regard to pollution of the environment.

SUMMARY OF THE INVENTION

It has been discovered that the disposal of aluminum compounds of the formula $R^1R^2R^3Al$ wherein R is a hydrocarbyl or hydrocarbyloxy radical, hydrogen or halogen is facilitated by reacting said compound with a hydroxide or carbonate of a Group I-A, II-A, IV-A or V-A element under substantially anhydrous conditions. The groups referred to herein are those listed in Masterson et al, "Chemical Principles", W. B. Saunders Company, Phila., 1969, p. 118 which corresponds to those of the 1955 Chart of Fisher Scientific Company. By hydrocarbyloxy radical is meant a radical of the type ($R^4$-O—) wherein $R^4$ is a hydrocarbyl radical. Typical hydroxides or carbonates useful in the process are calcium hydroxide, sodium hydroxide and sodium carbonate. By reacting the aluminum compound to be disposed of with such a hydroxide or carbonate in the absence of free water, the formation of highly corrosive aqueous hydrohalic acid by-products is avoided, and what is perhaps most important, the reaction is comparatively mild and inherently controlled avoiding the danger of explosions. Additionally, an end product is produced which is highly resistant to leaching out by water and which therefore is suitable for disposal as land-fill.

Preferred aluminum compounds disposed of in accordance with the present invention are compounds or systems wherein the R groups of the mass are halogen of atomic number from 17 to 35, alkyl radical, alkoxy radical, or hydrogen, Systems containing mixed R groups are usually statistical mixtures of various compounds of these categories. More preferred R groups are alkyl having from 1 to about 36 carbon atoms, hydrogen, chlorine, bromine, fluorine or iodine, especially compounds in which the R groups are alkyl having from about 1 to about 36 carbon atoms, or chlorine. Typical such compounds are diethyl aluminum chloride, ethyl aluminum dichloride, triethyl aluminum, dimethyl aluminum hydride, dimethyl aluminum chloride, triisobutyl aluminum, diisobutyl aluminum hydride, diethyl aluminum hydride, and the like.

Preferred hydroxides used in the process of the present invention are those of Group I-A or Group II-A elements, especially calcium hydroxide.

Preferably, the process of the present invention reacts an aluminum compound of the formula: $R^1R^2R^3Al$ wherein R is halogen of atomic number from 17 to 35, alkyl or alkoxy radical, or hydrogen with calcium hydroxide under substantially anhydrous conditions.

In one aspect, the present invention is directed to a process as aforesaid wherein the aluminum compounds are accompanied by metallic aluminum and the hydroxide or carbonate is calcium hydroxide and, in a second step of the process, the aluminum containing product of the first step is reacted with alkali metal hydroxide; especially sodium hydroxide.

The thus-described process is also useful in the disposal of mixed systems containing $R^1R^2R^3Al$ and $R_nM$, wherein the R of $R_n$ are as $R^1$, $R^2$ and $R^3$ defined previously; M is a Group IV-B, V-B, VI-B, VII-B or VIII metal, or an oxy radical thereof, especially -yl- radicals thereof, and $n$ is an integer equal to the valence of M. Preferred M elements or radicals are titanium ($Ti^{+++}$, $Ti^{++++}$, $TiO^{++}$), zirconium ($Zr^{++++}$, $ZrO^{++}$), vanadium ($V^{++}$, $V^{+++}$, $VO^{+++}$), nickel ($Ni^{++}$, $Ni^{+++}$) and cobalt ($Co^{++}$), $Co^{+++}$, $Co(H_2O)_6^{++}$, $Co(NH_3)_6^{++}$, $Co(H_2O)_6^{+++}$, $Co(NH_3)_6^{+++}$, and the like, especially titanium. Typical $R_nM$ compounds are $TiCl_3$, $TiCl_4$, $TiI_4$, $ZrI_4$, $CoCl_2$, $Co(OCOR)_2$, $Ni(OCOR)_2$, $VCl_3$, $VOCl_3$, nickel acetylacetonate and the like. Such mixtures are encountered, for example as catalyst residues from olefin polymerization processes. Preferred $R_nM$ compounds are titanium halides; especially, titanium trichloride and titanium tetrachloride.

Preferred systems disposed of in accordance with the present invention are compounds or systems wherein the R groups of the mass are hydrogen, alkyl, alkoxy or halogen of atomic number from 17 to 35. Included are systems containing mixed R groups which usually are statistical mixtures of various compounds set forth herein. In greater particularly, more preferred R groups are hydrogen, alkyl having from 1 to about 36 carbon atoms, or chlorine, especially compounds in which the R groups are alkyl having from about 1 to about 36 carbon atoms or chlorine. Typical such compounds are diethyl aluminum chloride, ethyl aluminum dichloride, triethyl aluminum, dimethyl aluminum hydride, dimethyl aluminum chloride, triisobutyl aluminum, diisobutyl aluminum hydride, diethyl aluminum hydride, titanium trichloride, titanium tetrachloride, zirconium trichloride, zirconium tetrachloride, hafnium trichloride, hafnium tetrachloride, titanium tribromide, titanium triiodide, titanium trifluoride, titanium tetrafluoride, and the like. Such systems are frequently contained in a solvent system which is hydrocarbon or a lower alcohol, especially an alkanol having from 1 to about 10 carbon atoms per molecule such as ethanol, n-propanol, iso-propanol, n-butanol, iso-butanol, sec-butanol, a pentanol, a hexanol or the like.

Preferred hydroxides used in the process of the present invention are those of Group I-A or Group II-A elements, especially calcium hyroxide.

Preferably, the process of the present invention reacts an aluminum compound $R^1R^2R^3Al$ or a titanium compound or mixture thereof the formula $R_nM$ wherein R is alkyl or alkoxy radical, hydrogen or halogen of atomic number from 17 to 35, and n is the valence of M, with calcium hydroxide, especially a mixture of $R^1R^2R^3Al$ and $R_nM$.

Although the process of the present invention is influenced to some degree by conditions, the conditions are not critical in any sense of the word. The proportions of the aluminum or $R_nM$ compounds relative to each other or to the hydroxide or carbonate likewise are not critical for the disposal reactions; the amount of the hydroxide or carbonate ranging from about 1 percent to about 1000 percent of the stoichiometric amount required to react with the aluminum compounds present. In general, to cause the aluminum or $R_nM$ compounds to be fully reacted and hence not reactive subsequently, it is desirable to use an excess of the hydroxide or carbonate. Such excess need not be any more than that necessary to insure substantially complete reaction of the aluminum or $R_nM$ compounds and may range from about 1 percent excess above the stoichiometric amount to about 10 times the stoichiometric amount of hydroxide or carbonate required to react with the aluminum or $R_nM$ compounds present. Usually it is desirable to use only a slight excess of hydroxide or carbonate, i.e., from about 1 percent to about 10 percent, to avoid the presence of such excess in the resulting mass. The order of addition of reactants is not critical; however, it is usually preferred that the aluminum or $R_nM$ compound or compounds to be treated be added to the hydroxide or carbonate and the resulting mixture thoroughly combined, the reaction being continued for a suitable length of time to obtain substantially complete reaction of the aluminum or $R_nM$ compounds.

The foregoing process is also desirably used as a preliminary step feeding first a Group II-A hydroxide or carbonate in a plural step process wherein the feed $R^1R^2R^3Al$, $R_nM$, or $R_nM$ plus $R^1R^2R^3Al$ is accompanied by metallic aluminum and wherein a subsequent step is used in which the M containing product of said preliminary step is subsequently combined with alkali metal hydroxide to react with the metallic aluminum. The two step processing is desirable to achieve low cost rapid and controlled conversion of the $R_nM$ or $R^1R^2R^3Al$ present as well as to obtain a rapid conversion of co-present metallic aluminum. The present invention is likewise usable for the treatment of waste streams similar to those which have been or are about to be described which contain the $R_3Al$ compounds as set forth and which do not have the $R_nM$ compounds.

DESCRIPTION OF THE PREFERRED EMBODIMENT

In the process of the present invention, preferred compounds of the formula $R^1R^2R^3Al$ and $R_nM$ wherein R is hydrogen, halogen, or hydrocarbyl or hydrocarbyloxy radical, M is a Group IV-B, V-B, VI-B, VII-B or VIII metal and n is an integer equal to the valence of M, is reacted with a hydroxide or carbonate of a Group I-A, II-A, IV-A, or V-A element. As a result of the reaction or reactions, which proceed comparatively mildly and under inherent control, the $R^1R^2R^3Al$ and $R_nM$ compounds are controllably converted to a form which is less violently reactive with water or substantially unreactive with water and the production of highly corrosive aqueous by-products such as HCl or HBr is avoided. In addition, the $R^1R^2R^3Al$ especially is converted to a non-reactive material which is poorly soluble in water and which therefore may be disposed of as ground-fill since it is substantially inert, non-toxic, and not readily leached out by surface or sub-surface waters.

$R_nM$ compounds that may require disposal are frequently present in heels or other residues connected with the production or use of reactive aluminum compounds such as aluminum alkyls, aluminum halides, alkyl aluminum hydrides or alkyl aluminum halides in chemical processing operations. Such compounds alone or in combination with other M compounds frequently are used as catalysts or co-catalysts; for example, as catalysts or reactants in the polymerization of olefins or in the production of alcohols. Typical system are described, for example, in U.S. Pat. Nos. 2,885,314; 2,886,581; 2,992,248; 3,028,408; 3,050,504; 3,050,541; 3,051,690; 3,086,038; 3,114,743; 3,136,621; 3,059,626; 3,160,672; 3,170,907; 3,384,651; 3,391,175 and 3,391,219. Further catalyst residues are discussed in German Pat. Nos. 1,301,524; 1,520,914; 2,005,733; 2,216,357; and 2,330,087 and in Belgian Pat. Nos. 575,671 and 585,431.

In one way of producing $R^1R^2R^3Al$ compounds, aluminum powder is present in excess in a repetitive batchwise process wherein a heel of material from a prior batch is retained in the reactor for the start of each new batch. In such a system, residues accumulate in the heel with the result that the reaction becomes more and more sluggish with succeeding batches necessitating the eventual discard of the residue remaining in the reactor. Such a residue usually contains aluminum powder as well as aluminum alkyl compound and is suitably treated in accordance with the process of the present invention so as to provide an innocuous waste material.

Aluminum compounds suitably disposed of in accordance with the teachings of the present invention may contain halogen or hydrogen and may be present with M elements such as titanium, zirconium, and hafnium or other elements such as sodium, potassium, lithium, manganese, iron, cobalt, nickel, silicon, phosphorous, arsenic, copper, zinc, cadmium, mercury, lead, antimony or bismuth, or compounds thereof. Typical aluminum compounds are ethyl aluminum dichloride, diethyl aluminum chloride, methyl aluminum dichloride, dimethyl aluminum chloride, ethyl aluminum sesquichloride which is a mixture of diethyl aluminum chloride and ethyl aluminum dichloride, methyl aluminum sesquichloride which is a similar mixture, n-butyl aluminum chloride, tetraethyl sodium aluminum, which behaves as a mixture of $(C_2H_5)_3Al$ and $NaC_2H_5$, diethyl dialuminum trichloro hydride, diethyl aluminum iodide, and diethyl aluminum bromide. One typical mixture is diethyl aluminum chloride and titanium trichloride.

In general, residual reactive metal such as aluminum or Group IV-B, V-B, VI-B, VII-B or VIII metal accompanying the $R^1R^2R^3Al$ or $R_nM$ feed, is converted to an inactive form such as $M'_xO \cdot Al_2O_3$.

Various hydroxides or carbonates that are exemplified for the performance of the present invention are NaOH, KOH, LiOH, $Na_2CO_3$, $K_2CO_3$, $Ca(OH)_2$, $Mg(OH)_2$, $CaCO_3$, $Fe(OH)_2$, $Fe(OH)_3$, and the like. Some of these materials, the carbonates especially, may be available in low cost forms which contain water of hydration. In some instances this water of hydration is held tightly by the crystal structure. Where the water is loosely held and reaction is too rapid as a result, it may be desirable to drive off water of hydration by a heating prior to use. In general, it is a matter of simple routine experimentation based on the procedures and considerations presented herein to determine if a particular hydroxide or carbonate sample is properly anhydrous to provide a convenient reaction rate. An excellent hydroxide is $Ca(OH)_2$. The equivalent structure is hydrated oxide terminology is $(CaO \cdot H_2O)$. This is preferred over the oxide CaO or the hydroxide $Ca(OH)_2$ with extra water. Thus compositions $xCaO \cdot yH_2O$ where (x/y) is not unity are generally less desired. To accelerate the reaction, (x/y) ratios of less than unity may be used.

Preferably, the hyroxide or carbonate is supplied and used in a finely divided state to provide rapid reaction and minimum waste; however, the particle size is not critical. Preferably, the particle size is from about 0.1 to about 1000 microns. A narrower more preferred range is from about 10 to about 300 microns, especially from about 100 to about 250 microns.

The reaction of the present process proceeds at a convenient mild rate over a wide range of temperature and pressure. Temperatures of about 0 to about 300° C are usable as are pressures from about 0.01 to about 100 atmospheres. Preferably, the process is conducted under ordinary conditions; that is, feeding the $R^1R^2R^3Al$ or $R_nM$ and the hydrated oxide or carbonate at about atmospheric pressure and at an ambient temperature of from about 0° to about 60° C. The reactor can be held at ambient temperature by cooling or the temperature allowed to rise as a result of the liberation of the heat of reaction. In general, it is desired to avoid localized heating to such temperatures as can cause decomposition of the hydrated oxide or carbonate since such decomposition may liberate free water so that the system is no longer properly termed "a substantially anhydrous system".

The foregoing process is subject to several variations. As an example, the liberation of hydrocarbons upon the reaction of $R^1R^2R^3Al$ or $R_nM$ compounds containing hydrocarbyl radicals may be lessened or avoided by subjecting such compounds to a preliminary oxidation reaction whereby at least a part of the hydrocarbyl radicals are converted to hydrocarbyloxy radicals which upon reaction with the hydroxide or carbonate produce by-product alcohol rather than by-product hydrocarbon. Where such oxidation is employed, it normally is employed without the desire to produce recoverable by-product alcohols; however, frequently the alcohols thus produced can be recovered by simple techniques such as extraction, flashing or stripping under vacuum, or the like, providing by-product value as well as providing a solubilizing of the system for the desired reaction. Such oxidation is conducted under conditions well known to those skilled in the art of oxidizing aluminum alkyl compounds and are described, for example, in U.S. Pat. No. 2,892,858. Typically, the oxidation is brought about by bubbling dry oxygen or air through the $R^1R^2R^3Al$ or $R_nM$ compound at temperatures of the order of 0° to 100° C for a period of time sufficient to convert at least a portion of the hydrocarbyl groups to hydrocarbyloxy groups.

The process of the present invention is preferably conducted in the presence of a solvent to provide good contact between what may be more or less solid reactants. The solvents are desirably substantially anhydrous inexpensive solvents such as paraffinic, olefinic or aromatic hydrocarbons, alcohols and the like. Where such solvent is originally co-present with the $R^1R^2R^3Al$ or $R_nM$ compounds, it frequently suffices for the present process without any additional amount of solvent or of a different solvent. The fact that such solvents can be recovered without having been exposed to water is a particular benefit of the present process. Kerosene is a preferred low cost solvent that can be added and recovered for recycle to the present process. Alcohols are used in some instances to facilitate phase separations whereby polymerization catalyst is more easily separated from polymer product. Thus alcohols, such as butanol are present and are desirably recovered for economic reasons. Solvents, in general, are selected if possible so as to avoid adverse reactivity in the system used for the present reaction, to avoid excessive expense and to provide materials that are readily recycled to this or to a prior step in a more complex process without excessive difficulty. As noted in the foregoing, alcohols from prior processing or process engendered alcohols or residual olefins are suitable solvents or co-solvents, fortuitously or otherwise present. Other typical hydrocarbon solvents are hexane, hexene, pentane, pentene, decane, decene, dodecane, dodecene, benzene, xylene and the like. Typical alcohol solvents, process engendered or otherwise, include methanol, ethanol, propanol, isopropanol, butanol, hexanol, and the like. The amount of solvent used is not critical and in general any amount is suitable or beneficial to some extent provided that, when deliberately added, it is not used in such large quantities as to unduly monopolize reactor volume. In general, the addition of excessive amounts of solvent is naturally undesired from a point of view of cost of separation and recycle which extrinsic factors may govern in regard to the amount of solvent desirable and the specific identify of the solvent selected for use. Solvent originally present with the $R^1R^2R^3Al$ or $R_nM$ as an effluent from a prior process step can be retained in the present process and thereafter recovered.

When residual metallic or free aluminum or Group IV-B metal is also present in the $R^1R^2R^3Al$ or $R_nM$ materials to be disposed of, it is usually advantageous to perform the disposal reaction in two steps using a comparatively mild group II-A hydroxide, such as $Ca(OH)_2$, in the first step to react the aluminum or M compound and then to add an alkali metal hydroxide such as sodium hydroxide, potassium hydroxide or lithium hydroxide to achieve a more rapid reaction of the remaining metallic aluminum or M in a subsequent step. In such a plural step reaction, the conditions and proportions are not critical and are selected in accordance with the foregoing criteria considering the amounts of Group II-A hydroxide and Group I-A hydroxide required to react with the different types of residual materials present. Although it is required to use substantially anhydrous conditions as defined for such a first or preliminary step to provide the inherent control in the conversion of the Al or M compounds, and avoid the production of aqueous hydrohalic acid, the second or subsequent or subsequent step usually is not so limited unless it is desired to recover anhydrous solvent after the second step.

The following examples indicate preferred embodiments and aspects of the present invention.

EXAMPLE I

To a 500 ml Erlenmeyer flask equipped with a stirrer and heater and in a dry-box was added 0.25 gram of $TiCl_3$, 0.24 gram of diethyl aluminum chloride, 1.0 gram of $Ca(OH)_2$, 50 ml of n-butanol and 450 ml of hexane. The mixture was heated to 55°–60° C, stirred at that temperature for 30 minutes, and then filtered. The filtration residue weighed 1.61 grams after drying. The initial content of aluminum in the total feed system was 163 ppm. The filtrate contained 2.5 ppm of aluminum. The initial content of titanium in the total feed system was 235 ppm. The filtrate contained 0.9 ppm of titanium. The butanol-hexane mixture was essentially anhydrous and readily separable into the components on distillation.

EXAMPLE II

To a 500 ml Erlenmeyer flask equipped with a stirrer, heater and in a dry-box was added 0.25 gram of $TiCl_3$, 0.24 gram of diethylaluminum chloride, 1.0 gram of $Ca(OH)_2$ and 500 ml of hexane. The mixture was heated to 45°–58° C, stirred at that temperature for 30 minutes and then filtered. The filtration residue had a dry weight of 1.15 grams. The initial content of aluminum in the total feed system was 163 ppm. The filtrate contained 13.6 ppm of aluminum. The initial content of titanium in the total feed system was 235 ppm. The filtrate contained 0.9 ppm of titanium.

EXAMPLE III

One hundred ten grams of a methyl aluminum sesquichloride heel (MASC) (containing about 50 wt. percent of $(CH_3)_2AlCl$ and $CH_3AlCl_2$ in about equimolar proportions plus about 10 wt. percent of aluminum powder and 40 wt. percent of $C_{12}$–$C_{16}$ olefins) was diluted to 400 milliliters with kerosene. An equal weight (110 grams) of lime $Ca(OH)_2$, 44 micron size, was slurried with 400 ml of kerosene (25.6 percent slurry). The lime slurry was placed in a 2-liter reactor equipped with a heat exchanger, a turbine-type agitator, and an off-gas absorber containing a 10 percent NaOH solution. The MASC slurry was added to the preheated lime slurry (60° C) slowly over a period of about 4 minutes with the agitator turning at 400 rpm.

The temperature of the reactor increased from the starting 60° C to 100° C in the first 5 minutes of reaction after the addition was completed, heating of the reactor having been discontinued. A maximum of 104° C was reached after ten minutes reaction time. The temperature began to drop after 15 minutes reaction time. The agitator speed was increased from 400 rpm to 500 rpm at this time and the temperature momentarily increased slightly. After 75 minutes reaction time the temperature had dropped to 87° C, at which time 20 grams of lime was added to the reaction mass. The temperature again begin to rise reaching 91° C. Ten milliliters of 25 percent aqueous solution of sodium hydroxide were then added to the mixture, the temperature rising further to 93° C. After 2 hours of reaction time, another 20 grams of lime was added to the mixture. No heat kick was observed this time.

Separate aliquots of the reaction mass were taken at 2½ hours reaction time. One of these was treated with water and the other with 50 grams of a 25 percent solution of sodium hydroxide in water. There was vigorous but controlled effervescence from both of these tests. Apparently, the aluminum metal had not reacted. After three hours reaction time, aliquots of the reaction mixture were unreactive with water and only slightly reactive with the 25 percent sodium hydroxide solution. An aliquot taken at 4½ hours reaction time produced only slight gassing when treated with 25 percent sodium hydroxide solution. At this point the residual aluminum appeared substantially dead to water and almost inactive to caustic and hence safe to dump as land-fill.

To separate the hydrolysis product, the mixture was allowed to stand over night ($\approx$16 hours) in a separatory funnel producing 437 grams of a heavy grease like sludge and 404 grams of clear kerosene. The sludge consisted of 19 weight percent easily filterable kerosene, 46 percent combustible cloudy liquid and 35 percent solids (residue on ignition). The ignited solid on subsequent analysis by X-ray diffraction pattern analysis was shown to consist of 12 $CaO·7Al_2O_3$, $CaO$ and $CaCO_3$ (relative amounts by weight 4:5:1 respectively). The filter cake prior to the ignition contained mostly amorphous material, $Ca(OH)_2·CaCl_2$ and $Ca(OH)_2$ in about a 1:2 weight ratio.

EXAMPLE IV

Example III was repeated. One hundred nine grams of the MASC heel of the type used in Example III were diluted with kerosene to 425 ml total volume (368.0 g). One hundred ten grams of $Ca(OH)_2$ (technical MCB) was mixed with 500 ml of recycled kerosene using an equipment set-up as in Example III.

The lime slurry was preheated to 63° C, the agitator set to 400 rpm. The heel solution was added to the lime slurry over a period of three minutes. The first hour of reaction was as in Example III. An addition of 20 grams of $Ca(OH)_2$ at the 1 hour reaction point produced only a slight heat kick. 80 ml of a 6.25 wt. percent sodium hydroxide-isopropanol-ethanol solution (200 grams isopropanol and 100 grams of ethanol per 20 grams NaOH) was then added, the temperature rising rapidly from 90° C to 120° C. After another 4 minutes reaction time, an additional 20 ml of alcoholic sodium hydroxide solution was added to the mixture, only a slight thermal kick being noted. Another 50 ml of alcoholic sodium hydroxide was added 40 minutes later at which time there was no heat kick but a sample of the solids was still reactive to aqueous caustic. After 2½ hours of total reaction time, 40 ml of a 25 wt. percent solution of sodium hydroxide in water was added to the mixture. There was a notable heat kick. Even after 5½ hours the solids were reactive to aqueous caustic. Apparently the alcoholic-caustic treatment did not completely convert the metallic aluminum particles in the heel mass.

The reaction mass was poured out on a coarse fritted filter and allowed to drain five days yielding 493.8 grams of clear kerosene (75 percent of the original amount of kerosene used) and 603 grams of a sludge paste. The sludge was approximately 33 percent solid. The kerosene was free of any active alkyl as shown by the absence of any reactivity thereof with water.

EXAMPLE V

The procedure of Example III was repeated using 250 ml of a 25 wt. percent solution of an ethyl aluminum sesquichloride heel (EASC) containing about equimolar amounts of diethyl aluminum chloride and ethyl aluminum dichloride plus 5 percent residual aluminum powder and 70 percent of a mixture of $C_{12}$ olefin and kerosene. This system was added to a slurry of 160 g of calcium hydroxide $Ca(OH)_2$ in 1 liter of kerosene which had been preheated to 40° C. The addition time was 2 minutes during which the temperature rose from 50° C to 65° C. The agitator was operated at 400 rpm. After 40 minutes reaction time, 100 ml of the 6.25 wt. percent alcoholic sodium hydroxide-isopropanol-ethanol solution was added. The temperature rose from 70° to 77° C in two minutes. After one hour, an additional 10 grams of calcium hydroxide was added to the reaction mass. There was no heat kick. After one and one half hours the mixture was inactive to both the water and sodium hydroxide aqueous solution tests.

The reaction mass was allowed to drain on a coarse fritted filter for five days yielding 624 grams of clear kerosene and 706.5 grams of sludge. An additional 152 grams of kerosene was drawn from the sludge by subsequent vacuum filtration.

EXAMPLE VI

A solution of 23 percent by volume diethyl aluminum chloride (DEAC) in kerosene was slowly poured onto powdered dry $Ca(OH)_2$ in a beaker. There was a very gentle effervescence of gas. No smoke or fog was produced. After ten minutes the oil was decanted from the solids and poured into $H_2O$. There was no apparent hydrolysis reaction indicating that the DEAC had been converted to a material that was not reactive with water.

EXAMPLE VII

Dry powdered lime was mixed into a 23 percent by volume DEAC-kerosene solution as used in Example VI. A gentle effervescence lasted about two minutes during which time the temperature rose from 25° to 35° C. The resulting mixture was filtered in the air. (There was no evidence of continuing alkyl hydrolysis). The oil filtrate was mixed with $H_2O$. There was no evidence of violent reaction; however, a very slight floc was noted in the test aqueous phase. The floc was soluble in added caustic.

The solids were calcined 5 hours at 1000° C. The XRD analysis of the calcined product showed 12 CaO·$Al_2O_3$ and CaO. X-ray diffraction pattern analysis of the uncalcined filter cake indicated the solids to be largely amorphous containing a very small amount of $Ca(OH)_2$.

EXAMPLE VIII

5 Grams of anhydrous potassium carbonate ($K_2CO_3$) was slurried in 25 ml of kerosene in a 100 ml beaker on a hot plate and heated to 70° C.

35 Ml of a 25 percent by weight ethyl aluminum sesquichloride solution in olefin and kerosene as described in Example V were then added to the beaker and the beaker covered with a watch glass. A gentle effervescence of gas occurred, the gas being acid to wet litmus paper. The solids in the beaker turned from white to brown. After 2 hours, the mixture was filtered yielding a filtrate which was substantially unreactive to water. The solids recovered from the filtration showed an amorphous state by X-ray diffraction analysis.

I claim:

1. A process for the disposal of an aluminum containing waste material having high reactivity with water and having an aluminum compound of the formula

wherein each of $R^1$, $R^2$ and $R^3$ is a hydrocarbyl radical, a hydrocarbyloxy radical, hydrogen or halogen, at least one of $R^1$, $R^2$ and $R^3$ being a hydrocarbyl radical, which process comprises reacting said compound under substantially anhydrous conditions with an anhydrous hydrolysis agent which is a hydroxide or carbonate of a Group II-A element.

2. The process of claim 1 wherein said hydrolysis agent is calcium hydroxide.

3. A process in accordance with claim 1 wherein the aluminum compound is accompanied by metallic aluminum and said hydrolysis agent is calcium hydroxide and, in a second step of the process, the aluminum containing product of the first step is reacted with alkali metal hydroxide.

4. The process of claim 3 wherein the alkali metal hydroxide is sodium hydroxide.

5. The process of claim 1 wherein said aluminum compound is an alkyl aluminum halide and said hydrolysis agent is calcium hydroxide.

6. The process of claim 1 wherein said aluminum compound is methyl aluminum sesquichloride and said hydrolysis agent is calcium hydroxide.

7. The process of claim 1 wherein said aluminum compound is diethyl aluminum chloride and said hydrolysis agent is calcium hydroxide.

8. The process of claim 1 wherein said aluminum compound is ethyl aluminum sesquichloride and said hydrolysis agent is calcium hydroxide.

9. The process of claim 1 wherein the R groups are halogen of atomic number from 17 to 35, alkyl radical, alkoxy radical or hydrogen, at least one R being alkyl radical.

10. The process of claim 1 wherein the R groups are alkyl radicals having from 1 to about 36 carbon atoms each, hydrogen, chlorine, bromine, fluorine or iodine, at least one R being alkyl radical.

11. The process of claim 1 wherein the R groups are alkyl radicals having from 1 to about 36 carbon atoms each, or chlorine, at least one R being alkyl radical.

12. The process of claim 1 wherein the R groups are halogen or atomic number from 17 to 35, alkyl radical, alkoxy radical, or hydrogen, at least one R being alkyl radical, and said hydrolysis agent is calcium hydroxide.

13. A process for the disposal of a mixed system waste material containing an aluminum compound having the formula $R^1R^2R^3Al$ and a compound $R_nM$, wherein each of $R^1$, $R^2$, $R^3$ and $R_n$ is a hydrocarbyl radical, a hydrocarbyloxy radical, hydrogen or halogen, at least one of $R^1$, $R^2$ and $R^3$ being a hydrocarbyl radical, M is a Group IV-B, V-B, VI-B, VII-B or VIII element and $n$ is an integer equal to the valence of M, which process comprises, reacting said system under substantially anhydrous conditions with an anhydrous hydrolysis agent which is a hydroxide or carbonate of a Group II-A element.

14. The process of claim 13 wherein M is titanium, zirconium, vanadium, nickel, or cobalt.

15. The process of claim 13 wherein M is titanium.

16. The process of claim 13 wherein $R_nM$ is titanium trichloride.

17. The process of claim 13 wherein said hydrolysis agent is calcium hydroxide.

18. A process in accordance with claim 13 wherein the aluminum compound and $R_nM$ are accompanied by metallic aluminum and said hydrolysis agent is calcium hydroxide and, in a second step of the process, the aluminum containing product of the first step is reacted with alkali metal hydroxide.

19. The process of claim 18 wherein the alkali metal hydroxide is sodium hydroxide.

20. The process of claim 13 wherein $R_nM$ is titanium tetrachloride.

21. The process of claim 13 wherein the R groups are halogen of atomic number from 17 to 35, alkyl radical, alkoxy radical, or hydrogen, at least one R being alkyl radical, and said hydrolysis agent is calcium hydroxide.

22. The process of claim 13 wherein the R groups are halogen of atomic number from 17 to 35, alkyl radical, alkoxy radical or hydrogen, at least one R group of $R^1$, $R^2$ and $R^3$ being alkyl radical.

23. The process of claim 13 wherein the R groups are alkyl radicals having from 1 to about 36 carbon atoms each, hydrogen, chlorine, bromine, fluorine or iodine, at least one R group of $R^1$, $R^2$ and $R^3$ being alkyl radical.

24. The process of claim 13 wherein the R groups are alkyl radicals having from 1 to about 36 carbon atoms each, or chlorine, at least one R group of $R^1$, $R^2$ and $R^3$ being alkyl radical.

25. The process of claim 13 wherein said aluminum compound is diethyl aluminum chloride, $R_nM$ is titanium trichloride and said hydrolysis agent is calcium hydroxide.

* * * * *

UNITED STATES PATENT OFFICE
CERTIFICATE OF CORRECTION

PATENT NO. : 4,018,867
DATED : APRIL 19, 1977
INVENTOR(S) : THOMAS E. LEE

It is certified that error appears in the above-identified patent and that said Letters Patent are hereby corrected as shown below:

Column 4, line 42, reads "system", should read -- systems --.
Column 5, line 36, reads "structure is", should read
-- structure in --; line 43, reads "hyroxide", should read
-- hydroxide --. Column 6, line 64, reads "identify",
should read -- identity --. Column 7, line 21, reads
"or subsequent or subsequent", should read -- or subsequent --.
Column 8, line 14, reads "begin", should read -- began --.
Column 10, line 66, reads "or atomic", should read -- of
atomic --.

Signed and Sealed this second Day of August 1977

[SEAL]

Attest:

RUTH C. MASON
Attesting Officer

C. MARSHALL DANN
Commissioner of Patents and Trademarks